Figure 1:
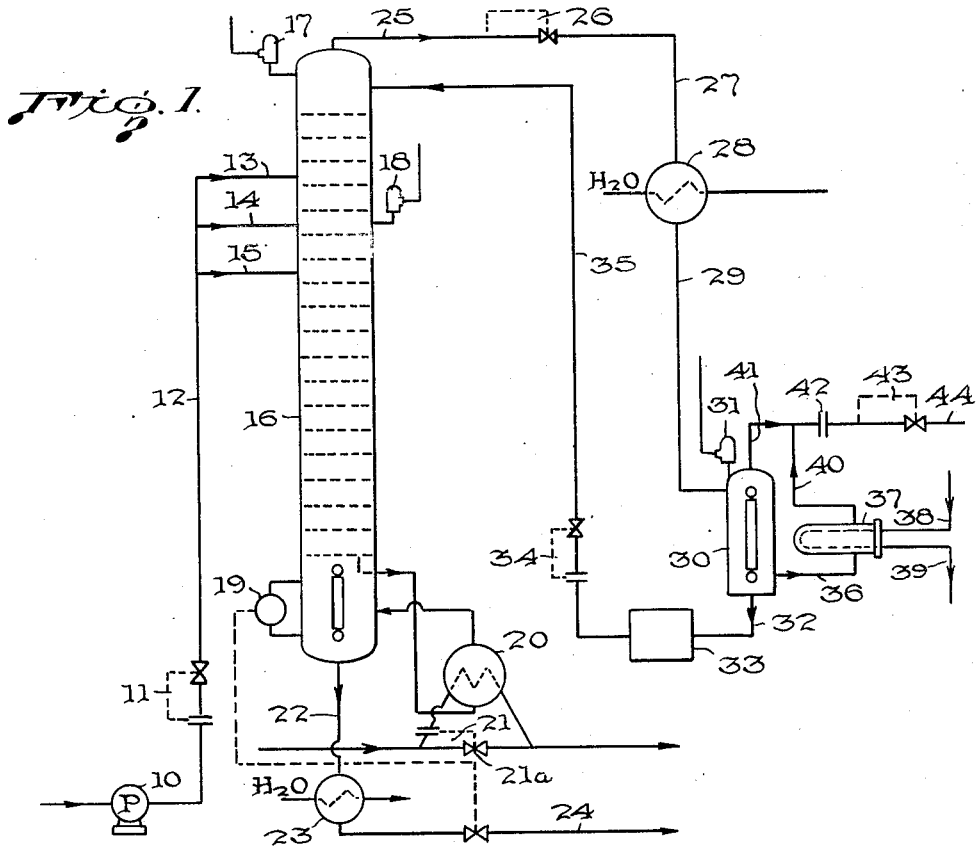

May 15, 1951     J. A. PELLETTERE     2,553,469
METHOD FOR FRACTIONAL DISTILLATION
Filed Dec. 26, 1946

Inventor
JOSEPH A. PELLETTERE
By R. McLoughlin
Attorney

UNITED STATES PATENT OFFICE

2,553,469

METHOD FOR FRACTIONAL DISTILLATION

Joseph A. Pellettere, Pittsburgh, Pa., assignor to Gulf Oil Corporation, Pittsburgh, Pa., a corporation of Pennsylvania Application December 26, 1946, Serial No. 718,279

2 Claims. (Cl. 62—2)

This invention relates to a method for fractional distillation and, more particularly, it is concerned with maintaining a constant reflux ratio in fractional distillation.

In the ordinary practice of fractionating petroleum distillates, unavoidable fluctuations or changes in load in various parts of the apparatus result in uneconomical and inefficient operations. In order to avoid such fluctuations as much as possible, the prior art has recognized that certain factors in the distillation operation should be maintained as constant as possible. Thus, it is common practice to attempt to provide a constant rate of feed of the mixture to be fractionally distilled, a constant pressure on the fractionating column, a constant heat input, and a constant reflux ratio in the column. Of these factors, that of providing a constant reflux ratio has proved the most difficult to carry out satisfactorily.

In the prior art, various methods and means have been employed to provide a constant reflux ratio, and assuming that the rate of feed, heat input and the pressure on the fractionating column are maintained constant, it has been attempted to maintain a constant level of condensate in the reflux accumulator, thereby to permit a constant rate of flow of reflux to the column. By maintaining the level of the condensate in the reflux accumulator substantially constant, and with the other factors above mentioned being constant, it is possible to maintain a constant reflux ratio throughout the distilling operation. However, the prior art attempts have not been particularly successful.

In one prior method for maintaining a constant level in the reflux accumulator, it has been attempted automatically to control the rate of condensation in accordance with the level of condensate in the reflux accumulator, the rate of condensation being increased when the level falls and, conversely, the rate of condensation being decreased when the level rises. This method of solving the problem has not proved satisfactory in practice. When the level of condensate begins to fall, more water is supplied to the condenser to increase the rate of condensation, but by the time additional condensate is obtained, the accumulator is empty and no condensate is available to serve as liquid reflux. At this time, the rate of condensation becomes so high that the accumulator fills to the top before the condenser responds to the increased level and reduces the flow of condensate. The net result is a cyclic operation with the accumulator alternately empty and brim full. Obviously, under such circumstances a constant reflux ratio cannot be maintained. Other means of control have been attempted, but have not been successful.

It is an object of this invention, therefore, to provide a method of fractional distillation wherein a constant reflux ratio is readily and economically obtained.

This and other objects are accomplished by the present invention wherein in a process for fractional distillation of a mixture of components, the mixture is supplied to a fractionating zone at a constant rate, heat is supplied to said mixture in the fractionating zone at a constant rate, the pressure on the fractionating zone is maintained substantially constant, the overhead of vaporized top product from the fractionating zone is condensed at a rate to produce an excess of condensate over that required to produce liquid reflux for the fractionating zone, and the excess of condensate so produced is vaporized by supplying heat to the condensate, thereby maintaining a constant level of condensate in the reflux accumulator and permitting a constant rate of flow of reflux liquid to the fractionating zone.

More particularly, I have found that in fractional distillation processes, particularly where it is attempted to separate light hydrocarbon fractions such as $C_3$ and $C_4$ hydrocarbon mixtures, if an excess of condensate is produced over that normally required to supply liquid reflux to the fractionating column, and if such excess is vaporized by supplying heat to the condensate, it is possible to maintain a constant level in the reflux accumulator and to obtain a constant reflux ratio in the fractionating column. In producing the excess of condensate, the condenser is so set that the rate of flow of cooling medium, such as water, through the condenser is sufficient to condense the maximum possible amount of vapors that may pass through the condenser by reason of variations in load at any time. In accordance with my invention, the reflux accumulator is provided with means to vaporize such excess by supplying heat thereto, thereby avoiding the accumulation of more condensate than can be used for reflux, and maintaining a constant level of reflux in the reflux accumulator. A convenient method of accomplishing such vaporization is to pass a portion of the condensate through a tubular heat exchanger in indirect heat exchange relationship with a heating medium, such as steam. The excess condendesired manner. In accordance with my invention, if the level of condensate in the reflux accumulator tends to rise and thus produce an excess of condensate over that required for reflux, that excess is substantially immediately vaporized. Conversely, if the level of condensate in the reflux accumulator tends to fall below the optimum required for reflux, less vaporization or no vaporization of condensate takes place and the level of condensate will tend to rise to the optimum point.

Figure 2:
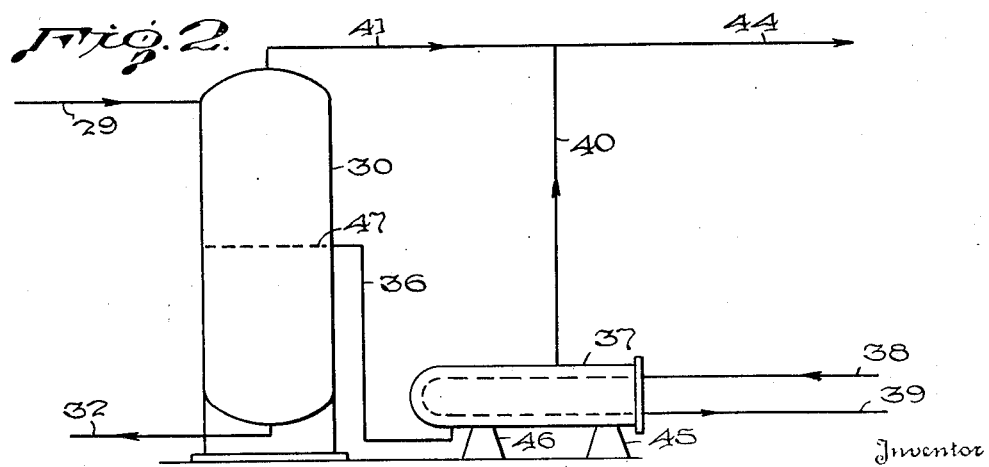

My invention will be fully understood from the following description taken with reference to the attached diagrammatic drawings, in which Figure 1 represents a preferred form of an apparatus for practicing the invention, and Figure 2 represents a modification of the vaporizing means of Figure 1.

Referring to Figure 1, there is shown a fractionating column 16 provided with safety valves 17 and 18, a reboiler 20 and feed lines 13, 14 and 15. The fractionating column is connected with a condenser 28, reflux accumulator 30 provided with a safety valve 31, and reflux pump 33 through suitable connections, as is more fully set forth below. Adjacent to the reflux accumulator there is provided a conventional tubular heat exchanger, such as the hairpin exchanger 37.

In operation, which will be described with reference to the separation of a mixture of $C_3$ and $C_4$ hydrocarbons, the mixed liquid feed is passed through pump 10, conventional recording flow controller 11, line 12 and multiple feed lines 13, 14 and 15 to suitable plates in the fractionating column 16. The recording flow controller 11 maintains a constant rate of flow of the feed. From the fractionating column 16, $C_3$ hydrocarbons are taken overhead through line 25 and $C_4$ hydrocarbons are taken as liquid bottoms through line 22, cooler 23, and line 24 and are passed to storage or any other desired disposition.

The conventional level controller 19 in the base of the fractionating column 16 serves automatically to maintain the liquid level in the column. Heat for the operation of the column is provided by reboiler 20, using steam or debutanized bottoms from a previous fractionation as the heating medium. The reboiler 20 is provided with a conventional recording flow controller 21 to maintain the flow of heating medium substantially constant and thus supply heat at a constant rate to the mixture to be fractionated. As shown in the drawing, the control valve 21a used with flow controller 21 is placed in the bypass of the heating medium line. However, the control valve 21a may be placed in the heating medium line either in the entrance to or exit from the reboiler, particularly when steam is used as the heating medium. As shown in the drawing, the reboiler operates on the thermo-syphon principle as is well understood in the art. The overhead vaporized top product, consisting of $C_3$ hydrocarbon vapors, passes through conventional recording pressure controller 26, which maintains the pressure on the column constant under all conditions of operation, and then passes through line 27, condenser 28 and line 29 into reflux accumulator 30. The rate of flow of cooling medium, such as water, through condenser 28 is set by hand so as slightly to overcondense, that is, to condense the maximum possible amount of $C_3$ hydrocarbon vapors which may be produced by reason of load fluctuations or changes. In the reflux accumulator, the level of condensate accumulated therein is maintained substantially constant as follows. A portion of the condensate flows through line 36 into the shell of the hairpin heat exchanger 37, supplied with steam or other suitable heating medium in the tubes through lines 38 and 39. The portion of the condensate entering the heat exchanger is vaporized and passes through line 40, conventional recording flow meter 42, conventional back pressure regulator 43 and line 44 to any desired disposition, such as fuel. Any surplus uncondensed vapors in the reflux accumulator 30, flow through line 41 to join the vaporized excess condensate in line 44. Liquid $C_3$ hydrocarbon reflux passes from accumulator 30 through line 32, reflux pump 33, conventional recording flow controller 34 and line 35 to the top of the fractionating column 16 at a constant rate. The level of condensate in the reflux accumulator is maintained approximately in the center of the heat exchanger 37. If the level of condensate begins to rise, more condensate enters the heat exchanger, more of the heated surface contained therein is covered by the condensate and, therefore, more heat is supplied to the condensate causing a faster rate of vaporization and bringing the level of the condensate down. If the level of the condensate in the accumulator begins to fall, less of the condensate enters heat exchanger 37 and less of the heating surface therein is exposed to the liquid, thereby decreasing the amount of vaporization of the condensate and increasing the level of condensate in the accumulator. Accordingly by this means I avoid any uncontrolled surges of condensate; the reflux pump operates under a substantially constant head and in combination with recording flow controller 34, furnishes a constant rate of flow of reflux to the fractionating column, thereby assuring a constant reflux ratio.

In the modification shown in Figure 2, the heat exchanger 37 may be supported on supports 45 and 46 on the ground, thus permitting easier servicing. The manner of operation of this modification is similar to that shown in Figure 1. Any condensate exceeding the optimum level, shown as dotted line 47, is vaporized in the heat exchanger and if the level falls below this point, no vaporization takes place.

While I have described my invention with particular reference to separation of a mixture of $C_3$ and $C_4$ hydrocarbons, it is not limited thereto but may be used for any fractional distillation, particularly where the overhead product of such distillation is easily vaporized. Although I have shown a tubular hairpin heat exchanger as the vaporizing means, other means of supplying heat to the condensate in accordance with the principle of my invention may be employed, as will be apparent to those skilled in the art.

I claim:

1. In a continuous process of fractional distillation, wherein a mixture of components is separated into liquid bottom product and vaporized top product in a fractionating zone and wherein the vaporized top product is condensed and a portion thereof is returned to the fractionating zone at a constant rate to serve as liquid reflux therefor; the method of maintaining a constant reflux ratio in said fractionating zone which comprises, maintaining a constant rate of feed to the fractionating zone, maintaining a constant rate of heat input to the fractionating zone, maintaining a constant pressure on the fractionating zone, condensing the vaporized top product at a rate to produce an excess of condensate over that required to produce liquid reflux for the fractionating zone, accumulating a pool of condensate, and maintaining the level of said pool of condensate substantially constant by removing said excess of condensate from said pool of condensate by varying the heat supplied to said removed excess of condensate in accordance with the variation in level of said pool of condensate to vaporize the above-mentioned excess of condensate.

2. A process for the separation of a mixture of $C_3$ and $C_4$ hydrocarbons by fractional distillation which comprises supplying said mixture to a fractionating zone at a constant rate, supplying heat to said mixture in the fractionating zone at a constant rate, maintaining a constant pressure on the fractionating zone, withdrawing liquid $C_4$ hydrocarbons from the bottom of the fractionating zone, withdrawing vaporized $C_3$ hydrocarbons from the top of the fractionating zone, condensing said voporized $C_3$ hydrocarbons at a rate to produce an excess of condensate over that required to produce liquid reflux for the fractionating zone, accumulating a pool of liquid $C_3$ hydrocarbon condensate, maintaining the level of said pool of liquid $C_3$ hydrocarbons substantially constant by removing said excess of condensate from said pool of liquid $C_3$ hydrocarbons by heating said excess of condensate by indirect heat exchange with steam while varying the amount of said heating in accordance with variation in level of said pool of liquid $C_3$ hydrocarbons to vaporize the said excess of condensate.

JOSEPH A. PELLETTERE.

REFERENCES CITED

The following references are of record in the file of this patent:

UNITED STATES PATENTS

| Number | Name | Date |
|---|---|---|
| 1,563,097 | Milker | Nov. 24, 1925 |
| 1,963,841 | Frankl | June 19, 1934 |
| 2,160,898 | Peff | June 6, 1939 |
| 2,348,659 | Smith et al. | May 9, 1944 |
| 2,355,589 | Brandt | Aug. 8, 1944 |
| 2,423,156 | Reid | July 1, 1947 |
| 2,,456,398 | Gerhold | Dec. 14, 1948 |